(12) United States Patent
Pan et al.

(10) Patent No.: US 8,136,565 B2
(45) Date of Patent: Mar. 20, 2012

(54) SPEED CHANGING TRANSMISSION MECHANISM OF SHEET LAMINATING APPARATUS

(75) Inventors: Yung-Tai Pan, Taipei (TW); Chang-Qi Wu, Guangzhou (CN)

(73) Assignee: Primax Electronics Ltd., Taipei (TW)

( * ) Notice: Subject to any disclaimer, the term of this patent is extended or adjusted under 35 U.S.C. 154(b) by 699 days.

(21) Appl. No.: 12/369,592

(22) Filed: Feb. 11, 2009

(65) Prior Publication Data

US 2010/0107797 A1 May 6, 2010

(30) Foreign Application Priority Data

Oct. 31, 2008 (TW) ................................ 97141957 A (51) Int. Cl.
*B32B 7/00* (2006.01)

(52) U.S. Cl. ........................ 156/555; 156/582; 156/583.1

(58) Field of Classification Search ................... 156/555, 156/580, 582, 583.1; 100/327, 155 R, 160, 100/176

See application file for complete search history.

(56) References Cited

U.S. PATENT DOCUMENTS

| | | | | |
|---|---|---|---|---|
| 6,874,555 | B1 * | 4/2005 | Hsiao | 156/555 |
| 7,406,993 | B2 * | 8/2008 | Lin | 156/555 |
| 7,556,077 | B2 * | 7/2009 | Chou | 156/555 |

* cited by examiner

*Primary Examiner* — James Sells
(74) *Attorney, Agent, or Firm* — Kirton McConkie; Evan R. Witt (57) ABSTRACT

A speed changing transmission mechanism of a sheet laminating apparatus includes a speed changing module, a motor, a switching gear, a hot press gear, a first connecting gear and a second connecting gear. By switching the switching gear to be engaged with different gear, the speed changing transmission mechanism is capable of hot laminating the sheet article and withdrawing the jammed sheet article.

12 Claims, 6 Drawing Sheets

SPEED CHANGING TRANSMISSION MECHANISM OF SHEET LAMINATING APPARATUS

FIELD OF THE INVENTION

The present invention relates to a sheet laminating apparatus, and more particularly to a sheet laminating apparatus for laminating a sheet article between two pieces of thermoplastic films.

BACKGROUND OF THE INVENTION

Conventionally, a sheet article such as a document or a photo is usually covered with a protective film for protection because such a sheet article is readily suffered from damage. Typically, a sheet laminating apparatus is used for laminating a sheet article between two pieces of protective films in order to achieve the protective purpose. Hereinafter, the configurations of a conventional sheet laminating apparatus will be illustrated with reference to FIG. 1.

Figure 1:
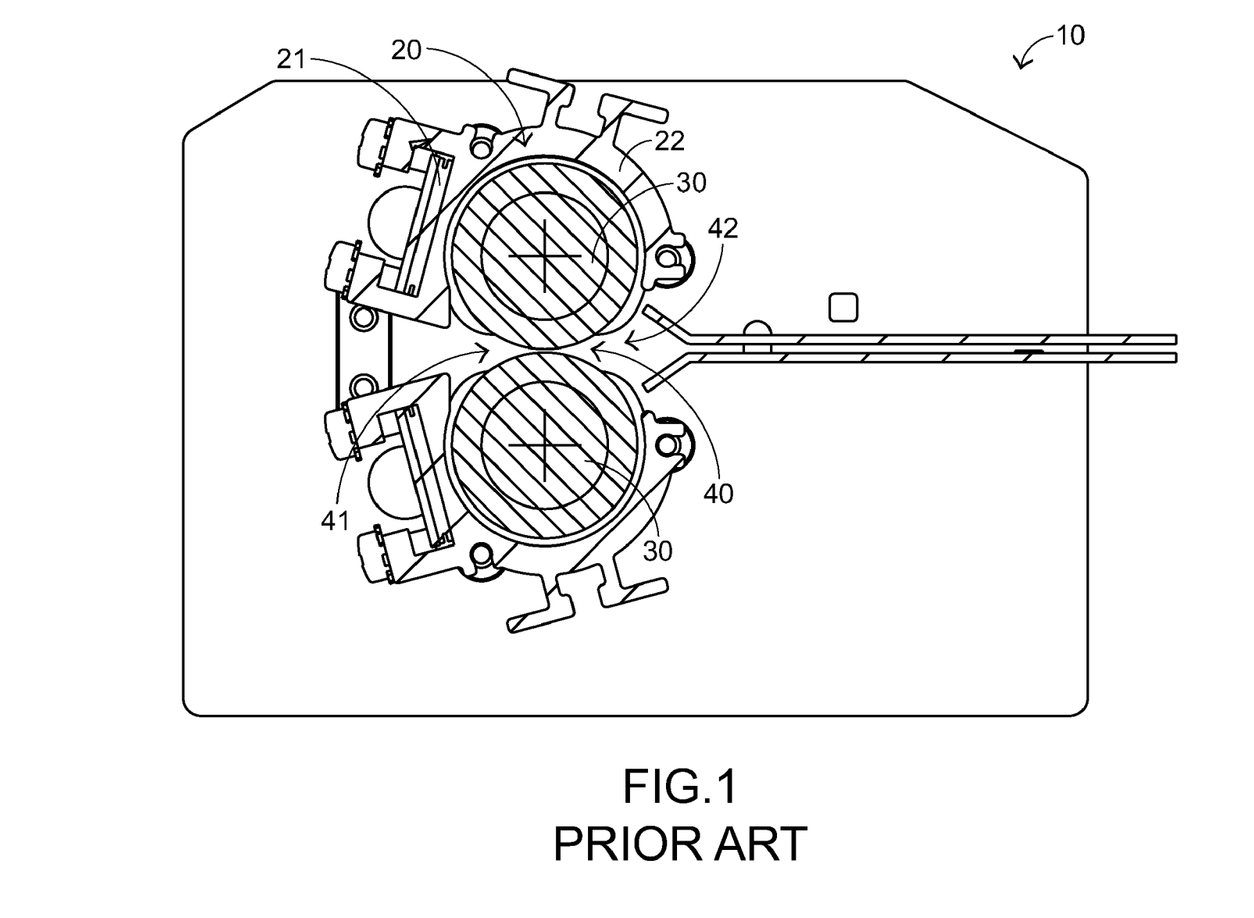
FIG. 1 is a schematic cross-sectional view of a conventional sheet laminating apparatus.

Referring to FIG. 1, a schematic cross-sectional view of a conventional sheet laminating apparatus is illustrated. The sheet laminating apparatus 10 of FIG. 1 principally comprises a heat-treating mechanism 20, a transmitting and pressing mechanism 30 and a transfer passage 40. The heat-treating mechanism 20 includes an electrically-heated plate 21 and a heater 22.

The process for laminating a sheet article (not shown) by using the sheet laminating apparatus 10 will be described as follows. First of all, the sheet article is sandwiched between an upper thermoplastic film and a lower thermoplastic film to form a sandwich structure. Then, the sandwich structure is fed into the transfer passage 40 of the sheet laminating apparatus 10 through an entrance 41. By means of the transmitting and pressing mechanism 30, the sandwich structure is continuously transported through the passage 40. During this stage, the electrically-heated plate 21 of the heat-treating mechanism 20 transforms electricity to heat energy so as to preheat the sandwich structure. The heat energy generated by the electrically-heated plate 21 is uniformly distributed over the heater 22, and radiated through an air gap between the heater 22 and the transmitting and pressing mechanism 30 so as to heat up the transmitting and pressing mechanism 30. The transmitting and pressing mechanism 30 presses against opposite sides of the sandwich structure which is transported through the transfer passage 40, and transmits the heat energy to the sandwich structure so as to soften the thermoplastic films. The heating and pressing procedure is also referred as a laminating procedure. After being transmitted and pressed by the transmitting and pressing mechanism 30, the sheet article bonds with the softened thermoplastic films to form a laminate structure. Meanwhile, the sheet article is fixed between these two pieces of thermoplastic films.

For most conventional sheet laminating apparatuses utilizing heat energy to laminate sheet articles, the problem of getting jammed is commonly found. In a case that the sheet article is adhered to the transmitting and pressing mechanism 30 during the process of transmitting and pressing the sandwich structure, or in another case that the thermoplastic films become too soft due to the elevated temperature, the possibility of getting jam in the transfer passage 40 is largely increased. If the sheet article is jammed in the transfer passage 40, the user may generally pull out the jammed sheet article by exerting a pulling force on the sheet article. If the problem of getting jammed is very serious, however, the pulling force is usually insufficient to pull out the jammed sheet article. Under this circumstance, the sheet laminating apparatus may have a breakdown.

In a case that the documents having different thickness are laminated by the sheet laminating apparatus at the same laminating speed, different working temperatures are used. As the thickness of the document is increased, the working temperature is increased. Whereas, as the thickness of the document is decreased, the working temperature is decreased. As known, the process of adjusting the working temperature of the sheet laminating apparatus is time consuming. For example, if the working temperature of the sheet laminating apparatus is increased from 100° C. to 130° C. for laminating a thicker document, a heating time period is required. At this time, the sheet laminating apparatus is capable of laminating the documents at a working temperature of 130° C. or more. On the other hand, for laminating the document at a working temperature lower than 130° C., a cooling time period is required to decrease the working temperature.

For solving the above drawbacks, a variable-speed sheet laminating apparatus was developed. The variable-speed sheet laminating apparatus is operated at a constant working temperature but at variable hot press speeds in order to laminate documents of various thicknesses. As the thickness of the document is increased, the hot press speed is increased. Whereas, as the thickness of the document is decreased, the hot press speed is decreased. Since a controller is used to adjust the rotating speeds of the motor, the conventional variable-speed sheet laminating apparatus is not cost-effective.

SUMMARY OF THE INVENTION

It is an object of the present invention to provide a sheet laminating apparatus that is operated at variable hot press speeds.

Another object of the present invention provides a speed changing transmission mechanism for use in a sheet laminating apparatus.

In accordance with an aspect of the present invention, there is provided a speed changing transmission mechanism of a sheet laminating apparatus for driving a hot press roller of the sheet laminating apparatus to laminate a sheet article at a first rotating speed or a second rotating speed. The speed changing transmission mechanism includes a speed changing module, a motor, a switching gear, a hot press gear, a first connecting gear and a second connecting gear. The speed changing module is used for controlling the hot press roller to rotate at the first rotating speed or the second rotating speed. The motor is connected to the speed changing module for providing motive power required for driving the speed changing module. The switching gear is connected to the speed changing module and rotated as the speed changing module is moved. The hot press gear includes a first-layered gear and a second-layered gear. The first connecting gear is engaged with the first-layered gear such that the hot press roller is rotated at the first rotating speed. The second connecting gear is engaged with the second-layered gear such that the hot press roller is rotated at the second rotating speed. If the switching gear is engaged with the first connecting gear upon movement of the speed changing module, the motive power of the motor is transmitted to the hot press gear through the switching gear and the first connecting gear so that the hot press roller is rotated at the first rotating speed. Whereas, if the switching gear is engaged with the second connecting gear upon movement of the speed changing module, the motive power of the motor is transmitted to the hot press gear through the switching gear and the second connecting gear so that the hot press roller is rotated at the second rotating speed.

In an embodiment, the speed changing module includes a shift lever, a linking lever and a driving gear. The shift lever includes an elongated saw-toothed part and an operable part. The linking lever has an arc-shaped saw-toothed terminal engaged with the elongated saw-toothed part of the shift lever. The driving gear is connected to the motor and engaged with the switching gear.

In an embodiment, the linking lever is rotated when the shift lever is moved by handling the operable part.

In an embodiment, the switching gear is arranged on the linking lever. The switching gear is selectively engaged with the first connecting gear or the second connecting gear upon rotation of the linking lever.

In an embodiment, the speed changing transmission mechanism further includes a driving shaft, which is sheathed by the driving gear and the linking lever. The motor is connected to the driving gear and the linking lever through the driving shaft.

In an embodiment, the speed changing transmission mechanism further includes a reverse gear, which is disposed beside the second connecting gear and engaged with the second connecting gear. The hot press roller and the motor are rotated in the same direction for withdrawing the sheet article from the sheet laminating apparatus when the switching gear is switched to be engaged with the reverse gear.

In an embodiment, the hot press gear is a combining gear set including a first-layered gear and a second-layered gear, wherein the first-layered gear and the second-layered gear are integrally formed.

In an embodiment, the speed changing transmission mechanism further includes a transmission shaft, which is sheathed by the hot press gear and the hot press roller such that the transmission shaft is rotated with the hot press gear. The hot press gear is arranged at a first side of the hot press roller.

In an embodiment, the speed changing transmission mechanism further includes a transmission gear arranged at a second side of the hot press roller. The transmission shaft is sheathed by the transmission gear such that the transmission gear is rotated with the transmission shaft.

In an embodiment, the speed changing transmission mechanism further includes a second hot press roller, a second transmission gear and a second transmission shaft. The second hot press roller is parallel with the hot press roller. The second transmission shaft is parallel with the transmission shaft. The second transmission gear is engaged with the transmission gear. The second hot press roller and the hot press roller are rotated in opposite directions.

In an embodiment, the first rotating speed is faster than the second rotating speed, and the first-layered gear is smaller than the second-layered gear.

In an embodiment, the motor is a unidirectional motor.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
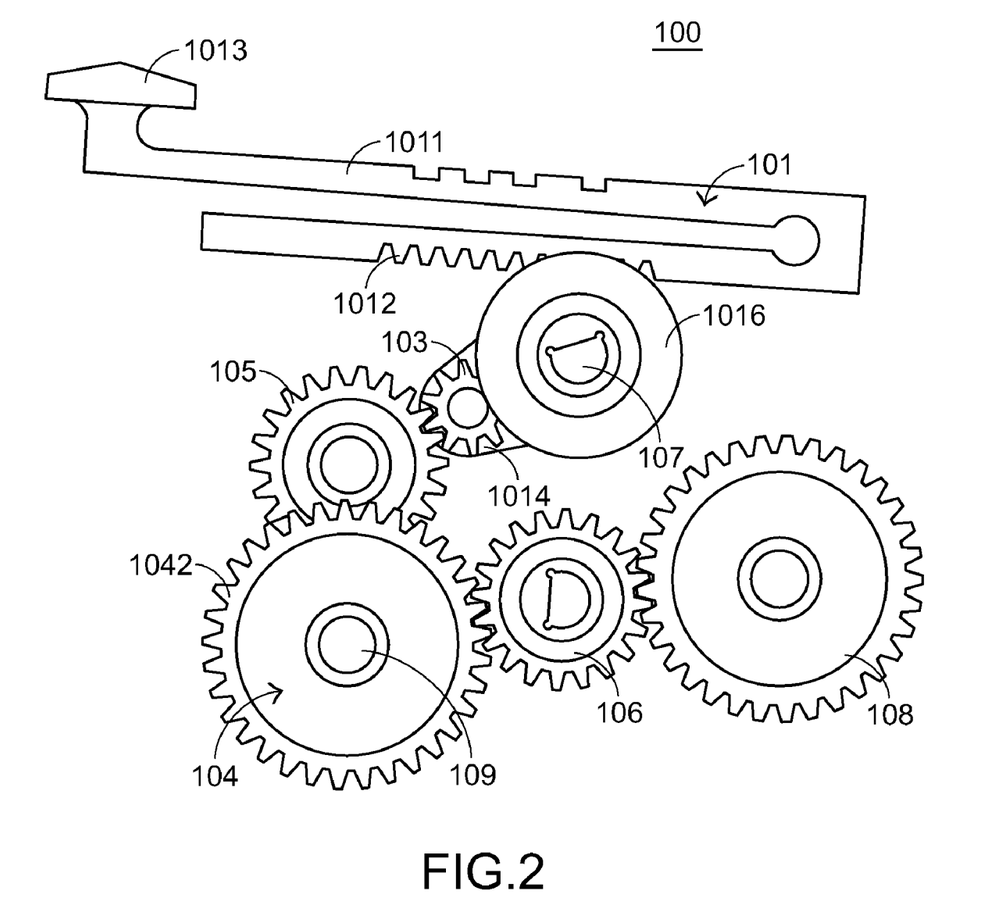
FIG. 2 is a schematic view illustrating a speed changing transmission mechanism of a sheet laminating apparatus according to a preferred embodiment of the present invention, in which the speed changing transmission mechanism is operated in a first rotating speed mode.
Figure 3:
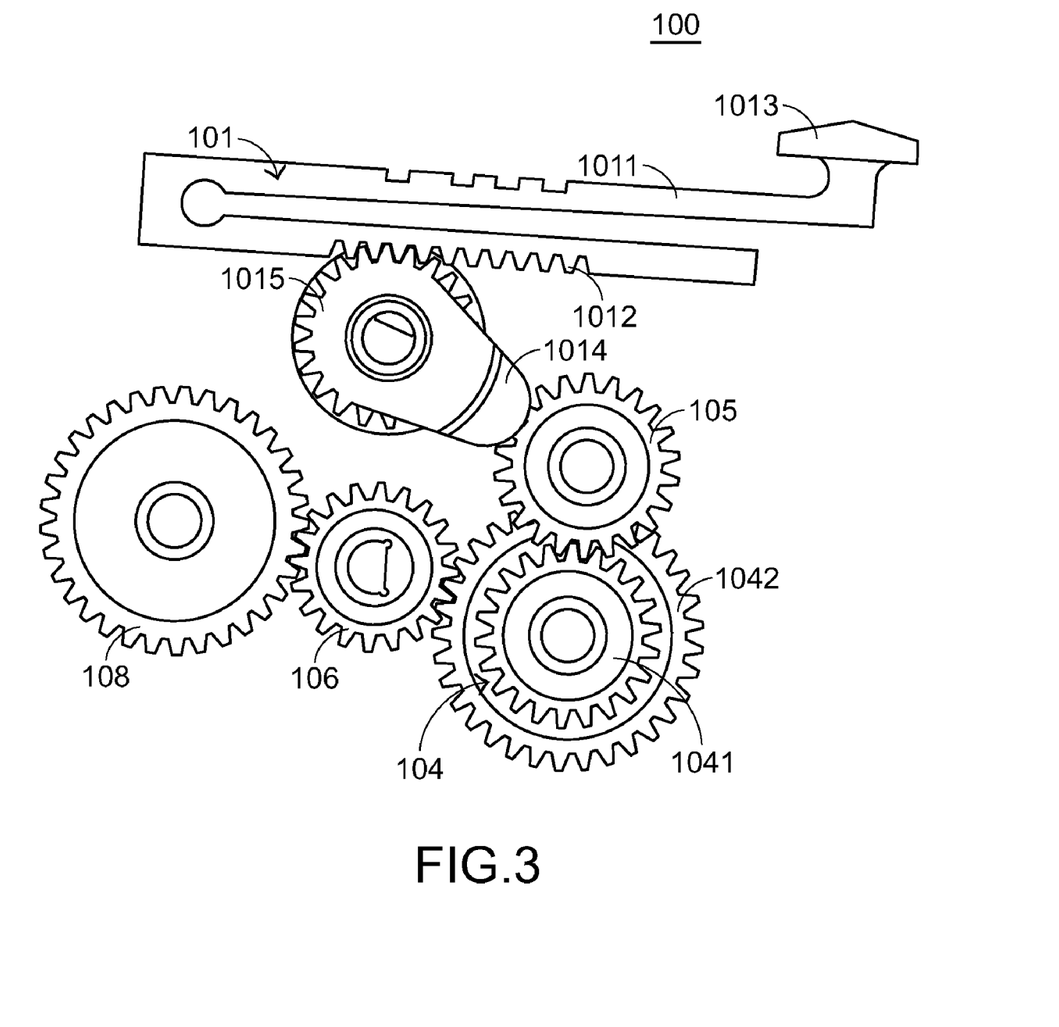
FIG. 3 is a schematic view illustrating the speed changing transmission mechanism as shown in FIG. 2 that is taken from another viewpoint.
Figure 4:
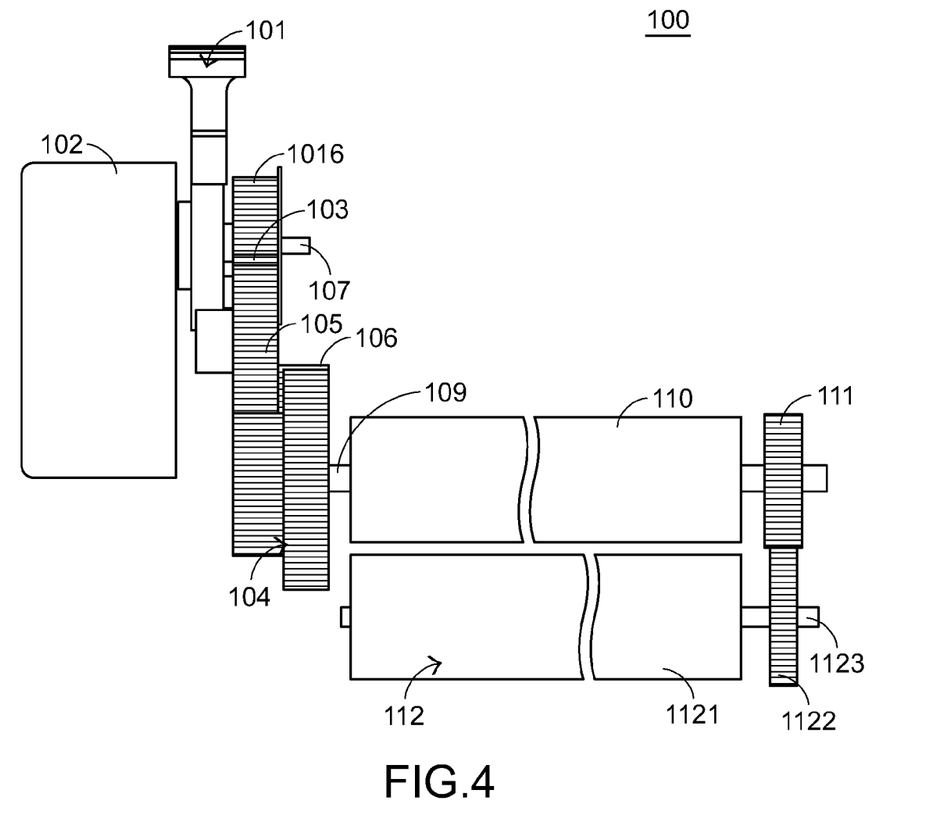
FIG. 4 is a schematic side view illustrating the speed changing transmission mechanism as shown in FIG. 2.

For solving the drawbacks encountered from the prior art, the present invention provides a sheet laminating apparatus having a speed changing transmission mechanism. FIG. 2 is a schematic view illustrating a speed changing transmission mechanism of a sheet laminating apparatus according to a preferred embodiment of the present invention, in which the speed changing transmission mechanism is operated in a first rotating speed mode. FIG. 3 is a schematic view illustrating the sheet laminating apparatus as shown in FIG. 2 that is taken from another viewpoint. Please refer to FIGS. 2 and 3. In this embodiment, the speed changing transmission mechanism 100 of the sheet laminating apparatus principally comprises a speed changing module 101, a unidirectional motor 102 connected to the speed changing module 101 (as shown in FIG. 4), a switching gear 103, a hot press gear 104, a first connecting gear 105, a second connecting gear 106, a driving shaft 107, a reverse gear 108 and a transmission shaft 109 (as shown in FIG. 4). The unidirectional motor 102 is connected to the speed changing module 101. By the speed changing module 101, the hot press roller 110 (as shown in FIG. 4) is controlled to be rotated at a first rotating speed or a second rotating speed or in a reverse direction. The speed changing module 101 includes a U-shaped shift lever 1011, a linking lever 1014 and a driving gear 1016. The shift lever 1011 includes an elongated saw-toothed part 1012 and an operable part 1013. The operable part 1013 is protruded outside the casing (not shown) of the sheet laminating apparatus to be manipulated by the user, thereby activating a speed changing operation or a reverse rotating operation. In addition, the linking lever 1014 has an arc-shaped saw-toothed terminal 1015. The arc-shaped saw-toothed terminal 1015 is engaged with the elongated saw-toothed part 1012 of the shift lever 1011. When the operable part 1013 is handled by the user, the shift lever 1011 is moved and thus the elongated saw-toothed part 1012 of the shift lever 1011 is also moved. As the elongated saw-toothed part 1012 is moved, the linking lever 1014 is rotated because the arc-shaped saw-toothed terminal 1015 is engaged with the elongated saw-toothed part 1012. In addition, the driving shaft 107 is sheathed by the driving gear 1016 and connected to the unidirectional motor 102. The driving gear 1016 is engaged with the switching gear 103.

The driving shaft 107 is also connected to the unidirectional motor 102 to acquire motive power required for operating the sheet laminating apparatus. Since the switching gear 103 is connected to the linking lever 1014 of the speed changing module 101, the switching gear 103 is rotated as the speed changing module 101 is moved. The reverse gear 108 is disposed beside the second connecting gear 106. The reverse gear 108 is engaged with the second connecting gear 106. The hot press gear 104 is a combining gear set, which includes a first-layered gear 1041 and a second-layered gear 1042. It is preferred that the first-layered gear 1041 and the second-layered gear 1042 are integrally formed. In addition, the diameter of the first-layered gear 1041 is smaller than that of the second-layered gear 1042. The first connecting gear 105 is engaged with the first-layered gear 1041. As such, the hot press roller 110 is rotated at a first rotating speed if the motive power of the unidirectional motor 102 is transmitted to the first-layered gear 1041. The second connecting gear 106 is engaged with the second-layered gear 1042. As such, the hot press roller 110 is rotated at a second rotating speed if the motive power of the unidirectional motor 102 is transmitted to the second-layered gear 1042. Since the first-layered gear 1041 is smaller than the second-layered gear 1042, the first rotating speed is faster than the second rotating speed.

FIG. 4 is a schematic side view illustrating the speed changing transmission mechanism as shown in FIG. 2. The power output elements of the speed changing transmission mechanism 100 comprises the hot press roller 110, a transmission shaft 109, a transmission gear 111 and another hot press roller module 112. The hot press roller module 112 comprises a second hot press roller 1121, a second transmission gear 1122 and a second transmission shaft 1123. The transmission shaft 109 is sheathed by the hot press gear 104 and the hot press roller 110 such that the transmission shaft 109 is rotated with the hot press gear 104. The hot press gear 104 is arranged at a first side of the hot press roller 110. The transmission gear 111 is arranged at a second side of the hot press roller 110. The transmission shaft 109 is also sheathed by the transmission gear 111 such that the transmission gear 111 is rotated with the transmission shaft 109. The second hot press roller 1121 is parallel with the hot press roller 110. The second transmission shaft 1123 is sheathed by the second hot press roller 1121 and the second transmission gear 1122. The second transmission shaft 1123 is also parallel with the transmission shaft 109. The second transmission gear 1122 is engaged with the transmission gear 111. When the motive power of the unidirectional motor 102 is transmitted to the transmission shaft 109, the hot press roller 110 and the second hot press roller 1121 are rotated in opposite directions because the transmission gear 111 is engaged with the second transmission gear 1122. As a consequence, the sheet article can be hot laminated by the hot press rollers 110 and 1121 when the sheet article is transmitted between the hot press rollers 110 and 1121.

Please refer to FIG. 3 again. For hot laminating the sheet article at the first rotating speed, the user may handle operable part 1013 of the shift lever 1011 such that the elongated saw-toothed part 1012 of the shift lever 1011 is moved. As the elongated saw-toothed part 1012 is moved, the linking lever 1014 is rotated because the arc-shaped saw-toothed terminal 1015 is engaged with the elongated saw-toothed part 1012. Please refer to FIGS. 2, 3 and 4 again. As the linking lever 1014 is rotated, the switching gear 103 that is connected to the linking lever 1014 is engaged with the first connecting gear 105. Meanwhile, the motive power of the unidirectional motor 102 is transmitted to the hot press gear 104 through the driving gear 1016, the switching gear 103, the first connecting gear 105 and the first-layered gear 1041. As such, the transmission shaft 109 that is sheathed by the hot press gear 104 is rotated at the first rotating speed. In other words, the hot press roller 110 is also rotated at the first rotating speed. In this embodiment, the unidirectional motor 102, the driving gear 1016 and the first connecting gear 105 are rotated in the clockwise direction. Whereas, the switching gear 103 and the hot press gear 104 are rotated in the anti-clockwise direction.

As a consequence, the hot press roller 110 is rotated in the anti-clockwise direction but the second hot press roller 1121 is rotated in the clockwise direction. It is found that the hot press roller 110 and the unidirectional motor 102 are rotated in opposite directions during the hot laminating procedure is performed.

Figure 5:
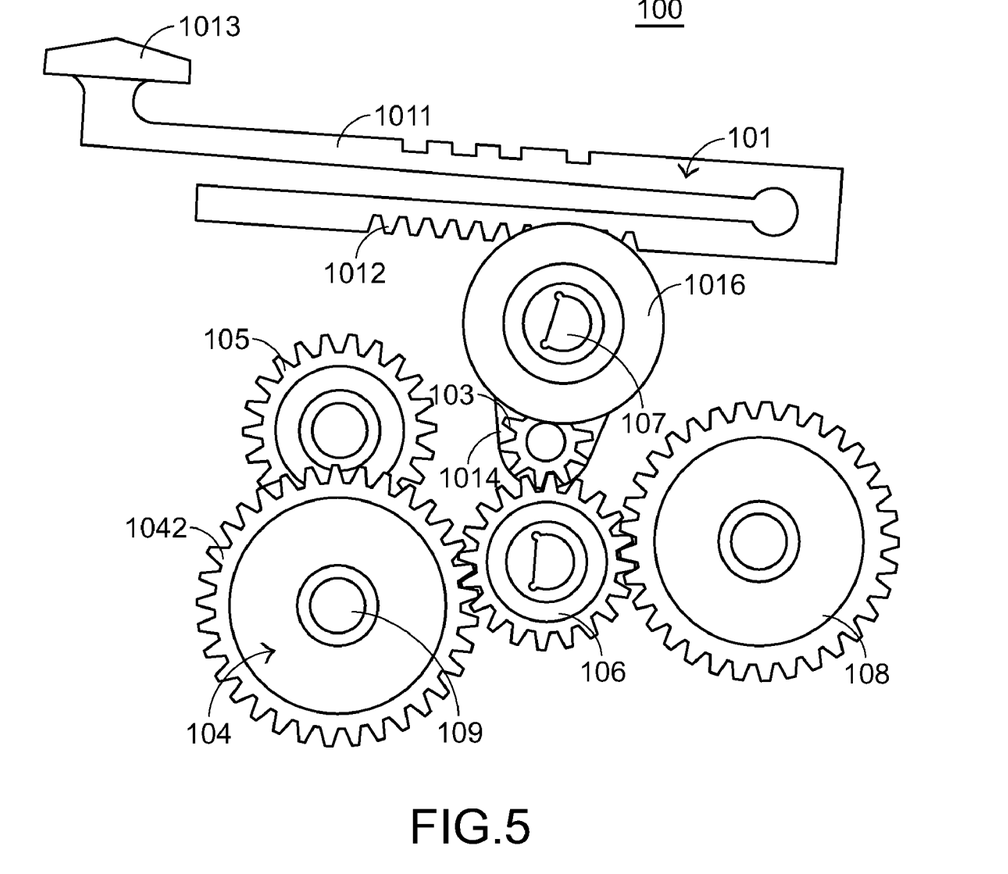
FIG. 5 is a schematic view illustrating the speed changing transmission mechanism according to the first embodiment of the present invention, in which the speed changing transmission mechanism is operated in a second rotating speed mode.

FIG. 5 is a schematic view illustrating the speed changing transmission mechanism according to the first embodiment of the present invention, in which the speed changing transmission mechanism is operated in a second rotating speed mode. For hot laminating the sheet article at the second rotating speed, the user may handle the operable part 1013 of the shift lever 1011 such that the elongated saw-toothed part 1012 of the shift lever 1011 is moved again. As the elongated saw-toothed part 1012 is moved, the linking lever 1014 is rotated such that the switching gear 103 is engaged with the second connecting gear 106. Meanwhile, the motive power of the unidirectional motor 102 is transmitted to the hot press gear 104 through the driving gear 1016, the switching gear 103, the second connecting gear 106 and the second-layered gear 1042. As such, the transmission shaft 109 that is sheathed by the hot press gear 104 is rotated at the second rotating speed and the hot press roller 110 is also rotated at the second rotating speed.

Figure 6:
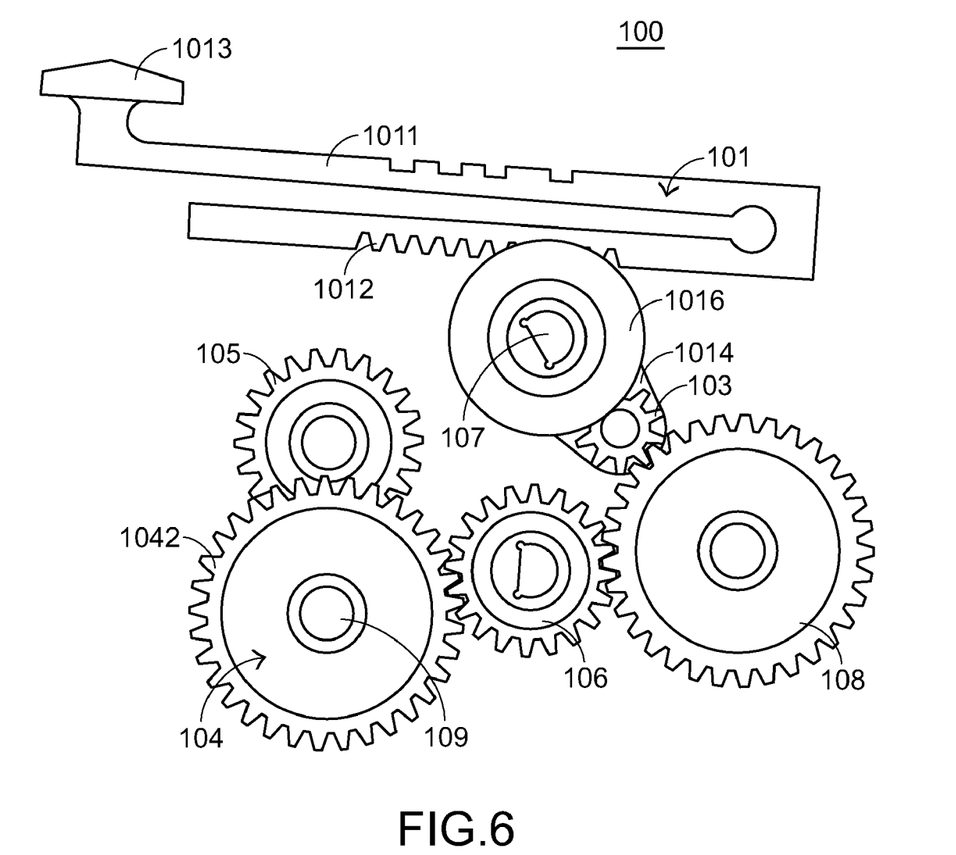
FIG. 6 is a schematic view illustrating the speed changing transmission mechanism according to the first embodiment of the present invention, in which the speed changing transmission mechanism is operated in a reverse rotation mode.

FIG. 6 is a schematic view illustrating the speed changing transmission mechanism according to the first embodiment of the present invention, in which the speed changing transmission mechanism is operated in a reverse rotation mode. In a case that the sheet article is jammed, the sheet article needs to be pull out of the sheet laminating apparatus. For removing the jammed sheet article, the user may handle the operable part 1013 of the shift lever 1011 such that the elongated saw-toothed part 1012 of the shift lever 1011 is moved again. As the elongated saw-toothed part 1012 is moved, the linking lever 1014 is rotated such that the switching gear 103 is engaged with the reverse gear 108. Meanwhile, the motive power of the unidirectional motor 102 is transmitted to the hot press gear 104 through the driving gear 1016, the switching gear 103, the reverse gear 108, the second connecting gear 106 and the second-layered gear 1042. As such, the transmission shaft 109 that is sheathed by the hot press gear 104 is rotated in a reverse direction. In other words, the hot press roller 110 is also rotated at the reverse direction. In this embodiment, the unidirectional motor 102, the driving gear 1016, the reverse gear 108 and the hot press gear 104 are rotated in the clockwise direction. Whereas, the switching gear 103 and the second connecting gear 106 are rotated in the anti-clockwise direction. As a consequence, the hot press roller 110 is rotated in the clockwise direction but the second hot press roller 1121 is rotated in the anti-clockwise direction. It is found that the hot press roller 110 and the unidirectional motor 102 are rotated in the same direction during the speed changing transmission mechanism is operated in the reverse mode. In the reverse mode, the hot press roller 110 and the second hot press roller 1121 are reversely rotated to withdraw the sheet article.

From the above description, the speed changing transmission mechanism of the sheet laminating apparatus according to the present invention can be operated in a first rotating speed mode or a second rotating speed mode in order to laminate a sheet article. In addition, the peed changing transmission mechanism is capable of withdrawing the jammed sheet article when operated in a reverse rotation mode. By using the speed changing transmission mechanism of the present invention, the sheet laminating apparatus can be operated at different rotating speeds and at the same temperature in order to laminate the sheet articles of various thicknesses.

Since no additional electronic controller is required to control the rotating speed of the motor, the sheet laminating apparatus of the present invention is more cost-effective. Moreover, if a jamming event occurs, the hot press rollers are reversely rotated to withdraw the sheet article, so that no additional costly bidirectional motor is required. In other words, the speed changing transmission mechanism of the sheet laminating apparatus according to the present invention has diverse functions and is cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A speed changing transmission mechanism of a sheet laminating apparatus for driving a hot press roller of said sheet laminating apparatus to laminate a sheet article at a first rotating speed or a second rotating speed, said speed changing transmission mechanism comprising:
   a speed changing module for controlling said hot press roller to rotate at said first rotating speed or said second rotating speed;
   a motor connected to said speed changing module for providing motive power required for driving said speed changing module;
   a switching gear connected to said speed changing module and rotated as said speed changing module is moved;
   a hot press gear comprising a first-layered gear and a second-layered gear;
   a first connecting gear engaged with said first-layered gear such that said hot press roller is rotated at said first rotating speed; and
   a second connecting gear engaged with said second-layered gear such that said hot press roller is rotated at said second rotating speed,
   wherein if said switching gear is engaged with said first connecting gear upon movement of said speed changing module, said motive power of said motor is transmitted to said hot press gear through said switching gear and said first connecting gear so that said hot press roller is rotated at said first rotating speed, and if said switching gear is engaged with said second connecting gear upon movement of said speed changing module, said motive power of said motor is transmitted to said hot press gear through said switching gear and said second connecting gear so that said hot press roller is rotated at said second rotating speed.

2. The speed changing transmission mechanism according to claim 1 wherein said speed changing module comprises:
   a shift lever comprising an elongated saw-toothed part and an operable part;
   a linking lever having an arc-shaped saw-toothed terminal engaged with said elongated saw-toothed part of said shift lever; and
   a driving gear connected to said motor and engaged with said switching gear.

3. The speed changing transmission mechanism according to claim 2 wherein said linking lever is rotated when said shift lever is moved by handling said operable part.

4. The speed changing transmission mechanism according to claim 3 wherein said switching gear is arranged on said linking lever, and said switching gear is selectively engaged with said first connecting gear or said second connecting gear upon rotation of said linking lever.

5. The speed changing transmission mechanism according to claim 2 further comprising a driving shaft, which is sheathed by said driving gear and said linking lever, wherein said motor is connected to said driving gear and said linking lever through said driving shaft.

6. The speed changing transmission mechanism according to claim 1 further comprising a reverse gear, which is disposed beside said second connecting gear and engaged with said second connecting gear, wherein said hot press roller and said motor are rotated in the same direction for withdrawing said sheet article from said sheet laminating apparatus when said switching gear is switched to be engaged with said reverse gear.

7. The speed changing transmission mechanism according to claim 1 wherein said hot press gear is a combining gear set including a first-layered gear and a second-layered gear, wherein said first-layered gear and said second-layered gear are integrally formed.

8. The speed changing transmission mechanism according to claim 1 further comprising a transmission shaft, which is sheathed by said hot press gear and said hot press roller such that said transmission shaft is rotated with said hot press gear, wherein said hot press gear is arranged at a first side of said hot press roller.

9. The speed changing transmission mechanism according to claim 8 further comprising a transmission gear arranged at a second side of said hot press roller, wherein said transmission shaft is sheathed by said transmission gear such that said transmission gear is rotated with said transmission shaft.

10. The speed changing transmission mechanism according to claim 9 further comprising a second hot press roller, a second transmission gear and a second transmission shaft, wherein said second hot press roller is parallel with said hot press roller, said second transmission shaft is parallel with said transmission shaft, said second transmission gear is engaged with said transmission gear, and said second hot press roller and said hot press roller are rotated in opposite directions.

11. The speed changing transmission mechanism according to claim 1 wherein said first rotating speed is faster than said second rotating speed, and said first-layered gear is smaller than said second-layered gear.

12. The speed changing transmission mechanism according to claim 1 wherein said motor is a unidirectional motor.

* * * * *